United States Patent Office

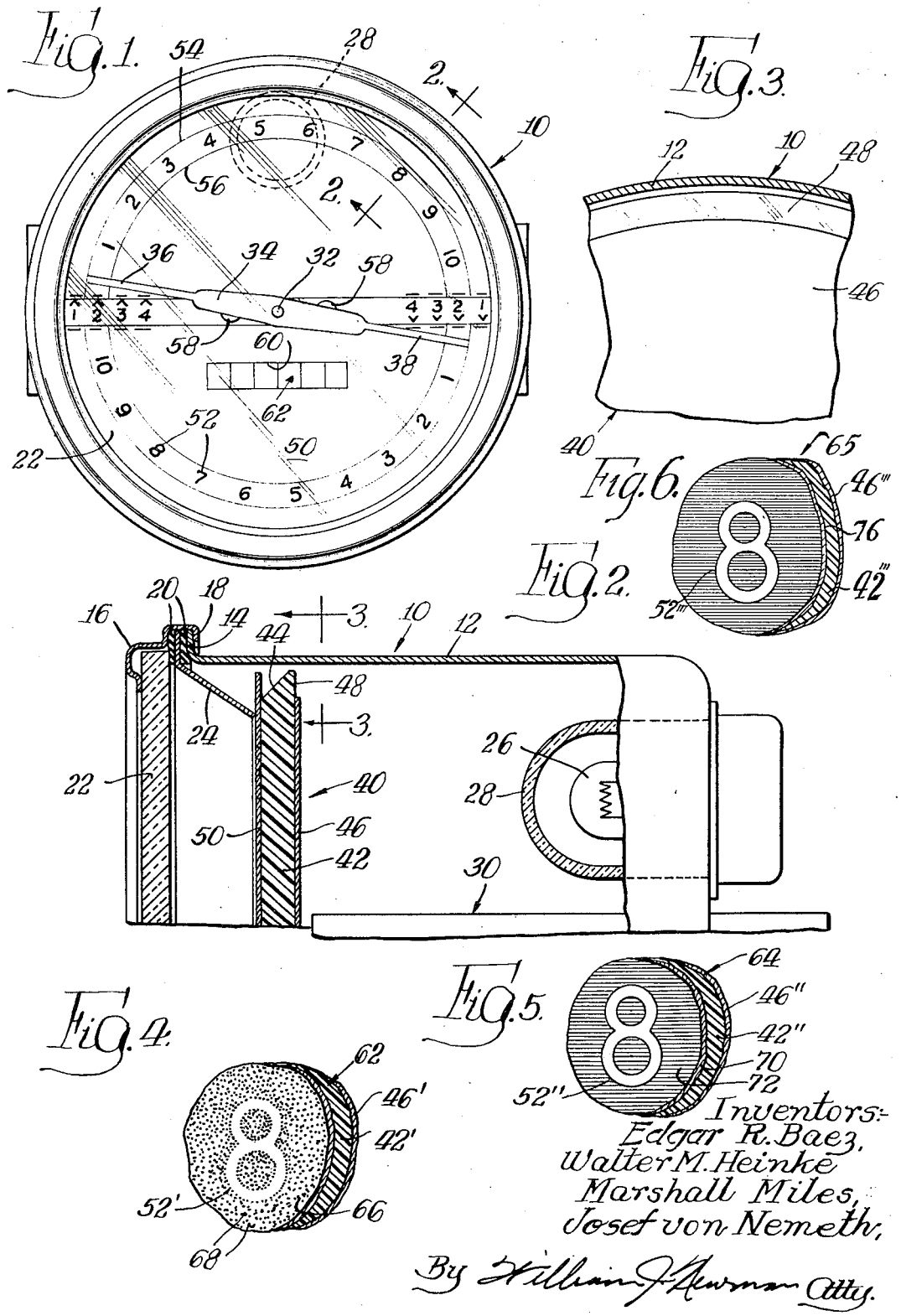

3,503,365
Patented Mar. 31, 1970

3,503,365
TRANSLUCENT INSTRUMENT DIAL MEANS
Edgar R. Baez, Evanston, Walter M. Heinke, Chicago, Marshall Miles, Wilmette, and Josef von Nemeth, Chicago, Ill., assignors to Stewart-Warner Corporation, Chicago, Ill., a corporation of Virginia
Continuation-in-part of application Ser. No. 587,207, Oct. 17, 1966. This application May 9, 1967, Ser. No. 641,105
Int. Cl. G09f 9/00
U.S. Cl. 116—129        18 Claims

ABSTRACT OF THE DISCLOSURE

Instrument lighting means having dial plate means adapted to transmit light from a light source within the casing to show the pointer and indicia in silhouette when the light source is energized and to show the pointer and indicia in contrasting reflected light when the light source is not energized. The dial plate is a transparent disc supporting a translucent layer of light colored material on the inside surface and various types of optical layers on the outside surface to produce different effects.

---

This application is a continuation-in-part of the copending application of Edgar R. Baez, Walter M. Heinke, Marshall Miles and Josef von Nemeth, Ser. No. 587,207, filed Oct. 17, 1966, and now abandoned.

The present invention relates to dial plate means which may be incorporated in an instrument assembly such as a tachometer, pressure gauge, temperature gauge, clock and the like, and which is adapted to be illuminated by an artificial light source.

Conventional instrument assemblies of the type indicated comprise a casing with an open forward end, a dial plate with indicia thereon disposed transversely of the casing adjacent the forward end thereof, indicator means movable across the dial plate and the indicia thereon, and means for illuminating the dial plate and indicator means. Presently, dial plates are illuminated either by edge lighting, by flood lighting from the side or above, by ultraviolet lighting, or by an electro-luminescence system. In most of these arrangements, the dial is not uniformly illuminated, the indicator means is not properly highlighted, the indicator actuating mechanism presents an undesirable shadow on the dial, and/or the illumination is excessively bright. In certain arrangements, the components and assembly thereof are unduly expensive. Moreover, in an electroluminescence system, a high voltage A.C. power source is required. Due to the foregoing disadvantages, existing dial plates and associated lighting techniques have not proved entirely satisfactory for mass-produced instrument assemblies.

It is an object of the present invention to provide instrument dial plate means so constructed that a pointer in front of the dial plate means is evenly illuminated in silhouette when a light source behind the dial plate means is energized.

It is another object of the present invention to provide instrument dial plate means so constructed that soft diffused light is substantially uniformly distributed over the dial plate means when a light source behind the dial plate means is energized.

It is another object of the present invention to provide embodiments of instrument dial plate means so constructed that they present a dark appearance when not illuminated from behind by a light source.

It is a further object of the present invention to provide instrument dial plate means that eliminate the shadow effect of indicator actuating mechanisms, that are inexpensive to fabricate and assemble, and that do not require special power sources.

Now in order to acquaint those skilled in the art with the manner of constructing and using instrument dial plate means in accordance with the principles of the present invention, there will be described in connection with the accompanying drawing preferred embodiments of the invention.

In the drawing:
FIGURE 1 is a front elevational view of an instrument assembly incorporating one embodiment of dial plate means of the present invention;
FIGURE 2 is a partial longitudinal sectional view, on an enlarged scale, of the instrument assembly of FIGURE 1, taken substantially along the line 2—2 in FIGURE 1, looking in the direction indicated by the arrows;
FIGURE 3 is a fragmentary transverse sectional view, taken substantially along the line 3—3 in FIGURE 2, looking in the direction indicated by the arrows;
FIGURE 4 is enlarged fragmentary view of a portion of a modified embodiment of dial plate means of the present invention;
FIGURE 5 is an enlarged fragmentary view of a portion of another modified embodiment of dial plate means of the present invention; and
FIGURE 6 is an enlarged fragmentary view of a portion of still another modified embodiment of dial plate means of the present invention.

Referring now to FIGURES 1, 2 and 3, there is indicated generally by the reference numeral 10 an instrument assembly in the form of a tachometer. The general showing of a tachometer is for illustrative purposes only, and those skilled in the art will appreciate that the principles of the present invention hereinafter described are applicable to various forms of instrument assemblies including pressure gauges, temperature gauges, clocks, and the like.

The instrument assembly 10 comprises a cylindrical casing 12 having a closed rear end and an open forward end with an outturned radial flange 14. Suitably secured at the forward end of the casing 12 is an annular collar 16 having an inturned radial flange 18 that engages the back side of the casing flange 14. The collar 16, together with the casing flange 14 and intermediate gaskets 20, serves to mount in position a glass cover 22 and a shroud-like retainer 24. Mounted interiorly of the casing 12 at the rearward end thereof is a light source 26, for example an incandescent 12-volt bulb, enclosed within a light diffuser 28. The light diffuser 28 may be varied in color to attain different color effects from the incandescent light source 26. Extending longitudinally into the casing 12 is a tachometer unit or mechanism of which a fragmentary portion is indicated at 30. The tachometer unit 30 includes a forwardly projecting indicator shaft 32 on the end of which is secured indicator means 34 comprised of opposed opaque pointer portions 36 and 38. The indicator means 34 is movable in a plane extending transversely of the casing 12 adjacent the retainer 24 at the forward end of the casing.

Dial plate means, indicated generally by the reference numeral 40, is disposed transversely of the casting 12 immediately rearwardly of the plane of the indicator means 34. The dial plate means 40 comprises a circular transparent disc 42 that serves as a light conductor. The disc 42 is composed of a crystal clear material, preferably plastic, such as an acrylic (e.g., Lucite or Plexiglas) or a polycarbonate (e.g., Lexan), selected to meet temperature and environmental requirements. The edge 44 of the disc 42 is bevelled in a forward direction at an angle of approximately 45 degrees.

The dial plate means 40 also comprises a circular layer of translucent material 46 on the rearward side of the disc 42. The material 46 is light in color, is preferably a white, silver or light blue paint, and may be applied in any conventional manner. The outer perimeter of the layer of material 46 is spaced radially inwardly of the margin of the back side of the disc 42 whereby to provide an annular clear area 48 to accommodate edge lighting as will be described hereinafter.

The dial plate means 40 further includes a layer of translucent material 50 on the front side of the disc 42. The layer of material 50 is in the form of a plastic overlay or sheet, fabricated for example of Mylar, and is preferably affixed to the disc 42 by pressure sensitive adhesive carried on the back side of the overlay. The overlay 50 is preferably white to provide a light-color background, and is overprinted on the front side with desired calibrations, numerals and other markings and indicia. By way of illustration, the overlay 50 may have applied thereto opaque numerals 52 and bands 54 and 56. Such numerals and bands will usually be of a dark color such as black, and, if desired, the area between the bands 54 and 56 may have applied thereto a translucent color such as orange or yellow to provide a color background for the numerals 52 that will contrast with the color of the remainder of the dial.

The dial plate means 40 is adapted to be mounted in position by means of screws 58 which extend through the dial and are threaded into the tachometer mechanism 30. The dial 40 is also suitably aperture in the center to accommodate the indicator shaft 32 and at 60 to permite exposure of the figure wheels of an odometer 62. It will be understood that the mounting of the dial, the formation of apertures therethrough, and the arrangement of colors and indicia or markings on the overlay 50 may be varied to meet the requirements of any particular instrument assembly.

When the light source 26 is energized, a portion of the light emitted passes through and is evenly diffused by the rear layer of translucent material 46. At the same time, light rays pass through the face of the annular clear area 48 of the disc 42 and are reflected at the bevelled edge 44 generally radially into the disc 42 where they ricochet between the layers of material 46 and 50. Finally, light within the disc 42 passes through and is evenly diffused by the forward translucent overlay 50. By reason of this combination of edge and back lighting, soft diffused light is substantially uniformly distributed over the entire overlay 50, and the indicator portions 36 and 38 are evenly illuminated in silhouette. Moreover, the overlay 50 does not display any appreciable shadow effect from the tachometer mechanism 30, even on the bottom or opposite portion of the dial from which the light source is located. It is to be noted that the edge lighting provided by the bevelled edge 44 can be eliminated if the mechanism 30 is sized and/or shaped as to not produce a substantial shadow problem.

Three modified embodiments of dial plate means 62, 64 and 65 are shown in FIGURES 4, 5 and 6. In these figures respectively, primed, double-primed and triple primed reference numerals have been used to indicate elements that are the same or similar to elements identified in FIGURES 1-3.

The dial 62 (FIGURE 4) comprises a front layer of translucent material 66 which is preferably white covered by a series of closely spaced equidistant dark color dots 68 applied preferably, but not necessarily, by silk screening. The indicia such as numeral 52' is formed either by the absence of dots 68 or by an overprint of an opaque light colored material such as white paint or ink.

The dial 64 (FIGURE 5) comprises a front layer of light color translucent material 70, which is overcoated with a solid translucent dark color material 72 (e.g., black paint). The indicia 52" is preferably formed by an opaque but light colored material such as white paint or ink.

The embodiment shown in FIGURE 6 of the dial plate means 65 also comprises a transparent disc 42''' with a light colored (preferably white or light blue) rearward layer 46'''. On the forward side of the dial plate means, however, is a plastic film 76 having a dark color (preferably black) homogeneously dispersed throughout the film 76 in order to provide dark optically absorbent film which is capable of absorbing substantially all of the ambient light falling on the dial as observed by the viewer when the light source 26 is unenergized, but which transmits a substantial portion of the light when the light source 26 is energized. The film 76 is preferably a black tinted plastic overlay material such as General Electric's polycarbonate film called "Lexan." This material may be used in unmodified or modified form. When unmodified, the Lexan material is transparent but serves to absorb a portion of light illuminating the dial. Alternatively, the Lexan film may be made translucent with a light diffusing surface by either applying a vaporized lacquer finish or providing a mat surface on the front side of the overlay. In place of a Lexan overlay, other light absorbent materials may be used, such as, for example, a photographic negative which has been exposed to light and subsequently developed. The indicia 52''' is preferabgly formed of an opaque light colored material such as white ink or paint which will show up as a light marking on a dark background when the light source 26 is not energized but appears as a dark silhouette on a light background when the light source is energized.

Each of the dials 62, 64 and 65 offers all of the advantages of the dial 40. Thus, in each of the modifications, soft diffused uniform lighting of the dial, and even illumination of the indicator portions in silhouette, are afforded when the light source is energized. When the light source is not energized, however, the dial 62, due to the dark dots, the dial 64 due to the dark overcoating, and dial 65 due to its dark homogeneous coloring, each present a dark appearance when the light source is not energized. This is so because the dark color tends to absorb ambient light as observed by the viewer when the light source 26 is not energized. Thus, the light colored opaque indicia and the light colored pointer appear in contrast to the dark background of the absorbent dial. However, when the light source is energized, some light is transmitted through the dial plates to give an even soft light appearance over the face of the dial. The opaque pointer and indicia take on the strikingly opposite appearance of dark silhouettes against the lighted dial background.

While there has been shown and described preferred embodiments of the present invention, it will be understood by those skilled in the art that various rearrangements and modifications may be made therein without departing from the spirit and scope of the invention.

What is claimed is:

1. An instrument assembly comprising a casing having an open forward end, indicator means having an opaque pointer portion of a desired color movable in a plane extending transversely of the casing adjacent the forward end thereof, a light source interiorly of the casing, and dial plate means disposed transversely of the casing intermediate of the pointer portion and the light source, said dial means comprising a transparent disc, a layer of translucent material covering the side of said transparent disc facing the light source and illuminated thereby, and a layer of optical light transmitting material of a desired color contrasting with said pointer portion color on the side of the disc opposite said light source, whereby the pointer portion is evenly illuminated in silhouette when the light source is energized.

2. The assembly of claim 1 wherein the edge of said transparent disc is bevelled in the direction of the pointer portion at an angle of approximately 45 degrees, and wherein the outer perimeter of said layer of translucent material is spaced inwardly of the margin of the associated side of said transparent disc, whereby said dial plate means is illuminated by both edge and back lighting when the light source is energized.

3. The assembly of claim 1 including opaque indicia on the layer of light transmitting material.

4. The assembly of claim 3 wherein said light transmitting material is light colored translucent and said opaque indicia and pointer are dark-colored, whereby soft diffused light is substantially uniformly distributed over said layer of light transmitting material with said pointer and indicia in silhouette when the light source is energized.

5. The assembly of claim 3 wherein said other layer of light transmitting material is a dark translucent color and said opaque indicia and pointer are light colored, whereby said dial plate means presents a dark appearance when the light source is not energized and a light appearance with said pointer and indicia in silhouette when said light source is energized.

6. The assembly of claim 3 wherein said layer of optical light transmitting material is a dark tinted film and said opaque indicia and pointer are light colored whereby said dial plate means represents a dark appearance when the light source is not energized and a light appearance with said pointer and indicia in silhouette when said light source is energized.

7. The assembly of claim 1 wherein said layer of light transmitting material is light colored and includes a series of closely spaced equidistant dark-color dots substantially throughout the area unoccupied by indicia, whereby said dial plate means presents a dark appearance when the light source is not energized and presents a light appearance with said pointer in silhouette when said light source is energized.

8. An instrument assembly comprising a casing having an open forward end and a closed rearward end, an indicator mechanism, an opaque light-reflective pointer movable by said mechanism in a plane extending transversely of the casing adjacent the forward end thereof, a light source interiorly of the casing, and a dial plate disposed transversely of the casing intermediate of the pointer portion and said light source, said dial plate comprising a transparent disc supporting a first layer of material on the surface opposite said light source and a second layer of material on the surface facing said light source, said first layer having the optical characteristics of causing absorption of substantially all ambient light incident thereupon but transmitting a substantial amount of light from said light source, and said second layer being light colored and translucent, whereby said dial plate has a dark appearance when said light source is not energized and has a light appearance with said pointer in silhouette when said light source is energized.

9. The assembly of claim 8 wherein the edge of said transparent disc is bevelled in the direction of said forward end at an angle of approximately 45 degrees, and wherein the outer perimeter of said second layer is spaced inwardly of the margin of the associated side of said disc whereby said dial plate is illuminated by both edge and back lighting when the light source is energized.

10. The assembly of claim 8 including opaque indicia of a light color on said first layer wherein said indicia appears as a light reflector when said light source is not energized and as a dark silhouette when said light source is energized.

11. An instrument assembly comprising a casing having an open forward end and a closed rearward end, an indicator mechanism, a dial plate extending transversely of the casing adjacent the forward end thereof, a light source interiorly of the casing between said dial plate and said closed rearward end, said dial plate comprising a transparent disc supporting a first layer of material on the surface opposite said light source and a second layer of material on the surface facing said light source, and opaque light colored indicia on said first layer, said first layer having the optical characteristics of absorbing substantially all ambient light incident thereupon but transmitting a substantial amount of light from said light source, and said second layer being light colored and translucent, whereby said dial plate has a dark appearance with light indicia when said light source is not energized and has a light appearance with dark silhouette indicia when said light source is energized.

12. The assembly of claim 11 wherein the edge of said transparent disc is bevelled in the direction of said forward end at an angle of approximately 45 degrees, and wherein the outer perimeter of said second layer is spaced inwardly of the margin of the associated side of said disc whereby said dial plate is illuminated by both edge and back lighting when the light source is energized.

13. The assembly of claim 12 wherein said indicator mechanism includes an opaque light-reflective pointer operable in a plane extending transversely of said casing adjacent the first layer bearing surface of said dial plate.

14. The assembly of claim 11 wherein said indicator mechanism includes an opaque light-reflective pointer operable in a plane extending transversely of said casing adjacent the first layer bearing surface of said dial plate.

15. An instrument assembly comprising a casing having an open forward end, indicator means having a dark colored opaque pointer portion movable in a plane extending transversely of the casing adjacent the forward end thereof, a light source interiorly of the casing, and dial plate means disposed transversely of the casing intermediate of the pointer portion and the light source, said dial means comprising a transparent disc, a layer of translucent light colored material covering the side of said transparent disc facing the light source and illuminated thereby, a film of substantially translucent light colored material adhesively attached to the surface of said transparent disc opposite said light source, and indicia formed of a dark-color opaque material on said translucent film whereby soft diffused light is substantially uniformly distributed over said disc with said pointer and indicia in silhouette when the light source is energized.

16. The assembly of claim 15 wherein the edge of said transparent disc is beveled in the direction of the pointer portion at an angle of approximately 45° and wherein the outer perimeter of said layer of translucent material is spaced inwardly of the margin of the associated side of said transparent disc, whereby said dial plate means is illuminated by both edge and back lighting when the light source is energized.

17. An instrument assembly comprising a casing having an open forward end, indicator means having a light colored opaque pointer portion movable in a plane extending transversely of the casing adjacent the forward end thereof, a light source interiorly of the casing and dial plate means disposed transversely of the casing intermediate of the pointer portion and the light source, said dial means comprising a transparent disc, a layer of translucent material on the side of said transparent disc facing the light source, a film of black tinted light transmitting material adhesively attached to the surface of said transparent disc opposite said light source, and indicia formed of light colored opaque material on said black film whereby said dial plate presents a dark appearance with light colored indicia and pointer when the light source is not energized and a light appearance with said pointer and indicia in dark silhouette when said light source is energized.

18. The assembly of claim 15 wherein said indicator mechanism includes an opaque light-reflective pointer operable in a plane extending transversely of said casing adjacent the first layer bearing surface of said dial plate.

(References on following page)

References Cited

UNITED STATES PATENTS

| | | | | |
|---|---|---|---|---|
| 1,917,079 | 7/1933 | Adams. | | |
| 2,993,985 | 7/1961 | Scrabonia. | | |
| 3,320,922 | 5/1967 | Taylor et al. | 73—431 |
| 2,009,210 | 7/1935 | Scantlebury | 240—2.1 |
| 2,100,875 | 11/1937 | Scantlebury | 240—2.1 |
| 2,214,209 | 9/1940 | Triplett | 240—2.1 |
| 2,267,267 | 12/1941 | Bulova | 240—2.1 X |
| 2,272,806 | 2/1942 | Klein et al. | 240—2.1 |
| 2,278,520 | 4/1942 | Klein et al. | 116—129 |
| 2,861,537 | 11/1958 | Kadlec | 116—129 |
| 2,886,911 | 5/1959 | Hardesty | 116—129 X |

LOUIS R. PRINCE, Primary Examiner

D. M. YASICH, Assistant Examiner

U.S. Cl. X.R.

240—2.1